United States Patent [19]

Davis, Jr. et al.

[11] Patent Number: 4,753,971
[45] Date of Patent: Jun. 28, 1988

[54] CHLORINATED POLYETHYLENE ELASTOMER COMPOSITION HAVING ENHANCED RESISTANCE TO OZONE-INDUCED CRACKING

[75] Inventors: William H. Davis, Jr., Baton Rouge; Raymond L. Laakso, Jr., St. Francisville; Michael E. Price, Addis, all of La.

[73] Assignee: The Dow Chemical Company, Midland, Mich.

[21] Appl. No.: 68,768

[22] Filed: Jul. 10, 1987

[51] Int. Cl.$^4$ .................. C08K 5/00; C08K 3/00; C08K 3/04; C08G 8/04

[52] U.S. Cl. .................. 524/109; 524/114; 524/296; 524/297; 524/321; 524/399; 524/400; 524/417; 524/423; 524/424; 524/427; 524/445; 524/447; 524/449; 524/451; 524/472; 524/530

[58] Field of Search .............. 524/109, 114, 296, 297, 524/321, 399, 400, 417, 423, 424, 427, 430, 437, 445, 447, 449, 451, 472, 530

[56] References Cited

U.S. PATENT DOCUMENTS

| | | | |
|---|---|---|---|
| 2,416,069 | 2/1947 | Scott | 260/79 |
| 2,480,008 | 8/1949 | Anderson | 260/41 |
| 2,534,078 | 12/1950 | Strain | 260/79.3 |
| 2,919,252 | 12/1959 | Canterino | 260/4 |
| 3,260,694 | 7/1966 | Wang | 260/41 |
| 3,531,455 | 9/1970 | Straub | 260/94.9 |
| 3,532,666 | 10/1970 | Csaszar | 260/41 |
| 3,565,974 | 2/1971 | Ohnuma et al. | 260/878 |
| 3,652,728 | 3/1972 | Cornay et al. | 260/878 R |
| 3,816,347 | 6/1974 | Luh | 252/511 |
| 3,845,166 | 10/1974 | Betts et al. | 260/897 C |
| 4,128,510 | 12/1978 | Richwine | 528/36 |
| 4,288,576 | 9/1981 | Richwine | 525/349 |

FOREIGN PATENT DOCUMENTS 817508  7/1969  Canada .................. 401/101

Primary Examiner—Herbert J. Lilling
Attorney, Agent, or Firm—D. R. Howard

[57] ABSTRACT

Peroxide vulcanizable chlorinated polyethylene compositions can, after being press cured at a temperature of 204° Centigrade for a period of ten minutes, withstand ozone-induced cracking for a period of 168 hours or more when elongated 60% and exposed to 200 parts of ozone per hundred million parts of air at a temperature of 400° Centigrade.

12 Claims, No Drawings

CHLORINATED POLYETHYLENE ELASTOMER COMPOSITION HAVING ENHANCED RESISTANCE TO OZONE-INDUCED CRACKING

BACKGROUND OF THE INVENTION

The present invention generally concerns a curable chlorinated polyethylene elastomer composition having improved resistance to ozone-induced cracking. More particularly, the present invention concerns a curable chlorinated polyethylene composition which, after vulcanization, by press curing, with a peroxide compound under extreme conditions, e.g., at a temperature of 204° Centigrade for a period of ten minutes, resists ozone-induced cracking for a period of at least 168 hours in a severe test environment. The "severe test environment" is described in detail hereinbelow.

Vulcanization or curing of saturated, halogen-containing polymers such as chlorinated polyethylene is a well known process. Such curing generally takes place either with a non-peroxide compound and a base or with a peroxide compound and a vulcanization accelerator.

It has been discovered that ozone resistance, as defined by the absence of cracking, of peroxide-cured chlorinated and chlorosulfonated polyethylene materials varies considerably depending upon a number of factors. One factor is the amount of moisture present during ozone testing. For example, some materials have an ozone resistance in excess of one hundred hours when tested in the absence of moisture. The same materials will have an ozone resistance of five hours or less when tested at a relative humidity of 50% or more. A second factor is found in the combination of time and temperature used to cure the materials. For example, a material cured at a temperature of 177° Centigrade for a period of twenty minutes may have satisfactory ozone resistance whereas the same material cured at a temperature of 204° Centigrade for a period of ten minutes cracks in only a few hours under severe ozone test conditions. A third factor is the cure package used to effect vulcanization of the materials.

It would be desirable if there were available a vulcanizable chlorinated polyethylene composition which, after curing, exhibited resistance to ozone-induced cracking for a period of 168 hours or more in a severe ozone test environment, particularly when such curing takes place under extreme conditions, e.g., at a temperature of 204° Centigrade for a period of ten minutes.

It would also be desirable if such a compound also exhibited good processing and rubber-like properties suitable for use in the manufacture of hoses, tubing, molded goods and wire and cable insulation/jackets.

SUMMARY OF THE INVENTION

One aspect of the present invention is a curable composition which, after vulcanization by press curing at a temperature of 204° Centigrade for a period of ten minutes, resists ozone-induced cracking for a period of at least 168 hours when a sample thereof prepared in accordance with ASTM D 3182-74 is exposed to 200 parts of ozone per hundred million parts of air at a temperature of 40° Centigrade and a relative humidity of 55% while the sample is elongated, in accordance with a modified DIN 53509-part 1 procedure, 60%, said composition comprising (a) 100 parts by weight of a chlorinated polyethylene resin having a chemically combined halogen content of from about 15 to about 40 percent by weight of polymer, (b) from about 50 to about 150 parts of filler material, (c) from about 50 to about 60 parts by weight of a plasticizer which is compatible with the chlorinated polyethylene resin and does not interfere with peroxide crosslinking, (d) from about 5 to about 10 parts by weight of a stabilizer, (e) an amount of a peroxide compound sufficient to provide results equivalent to those obtained with from about 0.5 to about 2 parts by weight of $\alpha,\alpha'$-bis-(t-butylperoxy)diisopropylbenzene (100% active), (f) from about 5 to about 10 parts by weight of triallyl cyanurate, the ratio of the peroxide equivalent of (e), 0.5 to 2, to (f) being from about 0.05 to about 0.4. The composition following vulcanization has suitable thermoset elastomeric physical properties.

A related aspect of the present invention includes vulcanized products formed from the curable composition.

DETAILED DESCRIPTION OF THE INVENTION

The term "severe ozone test environment", as used herein, refers to an atmosphere containing 200 parts of ozone per hundred million parts of air, a temperature of 40° Centigrade and a relative humidity of 55%. Test samples exposed to such an environment are elongated in accordance with a modified DIN 53509-part 1 procedure. The test samples have a thickness of four millimeters (mm), a width of 45 mm and a length of 55 mm. The samples are elongated in the machine direction by bending them so the ends touch and fit in a notch in a test platform. The notch is in the shape of a trapezoid having a top or opening of 8 mm, a base of 10 mm and a height of 8 mm.

Chlorinated polyethylene materials suitable for purposes of the present invention are chlorinated polyethylene resins having a chemically combined chlorine content which is beneficially from about 15 to about 40 percent by weight of polymer. The chemically combined chlorine content is desirably from about 26 to about 38 percent by weight of polymer. The chlorinated polyethylene resins are prepared by chlorination of essentially linear, finely-divided polyethylene or olefin interpolymers containing at least about 90 mole percent of ethylene and up to about 10 mole percent of one or more ethylenically unsaturated monomers copolymerizable with ethylene. The polymers, prior to chlorination, suitably have a weight average molecular weight of less than about 1,000,000.

Particularly suitable chlorinated polyethylene materials are prepared in accordance with copending patent application Ser. No. 894,441, filed Aug. 1, 1986. Such resins have (a) a neat wedge blocking value (measured in accordance with U.S. Pat. No. 4,412,448) of from about 0 to about 60 kilograms, (b) a weight-based median particle size of from about 200 to about 900 microns and (c) a chemically combined chlorine content of from about 26 to about 42 percent by weight of polymer. The chlorinated materials are prepared, in the absence of silicic acid or silicon oil, from a polyethylene resin having (a) a weight-based median particle size of from about 120 to about 600 microns, (b) a weight-based particle size distribution such that more than about 60 percent of the particles have a particle size of from about 130 to about 850 microns, (c) a bulk density of from about 0.216 to about 0.56 grams per cubic centimeter, and (d) a density of from about 0.958 to about 0.965 grams per cubic centimeter. Of these resins, those having a chemically combined chlorine content of from about 26 to about 38 percent by weight of polymer provide optimal results.

The polyethylene and olefin interpolymers are beneficially prepared under conditions characteristic of Ziegler polymerization in the presence of a transition metal-containing catalyst and at least one cocatalyst or activator. The cocatalyst is selected from the group consisting of aluminum, boron, zinc, or magnesium compounds represented by the formulas $Al(R^3)_{3-a}X^1a$, $B(R^3)_{3-a}X^1a$, $MgR^3_2$, $MgR^3X^1$, $ZnR^3_2$ or mixtures thereof. In these formulas, each $R^3$ is independently a hydrocarbyl group, $X^1$ in a halogen and a is an integer of from zero to two. U.S. Pat. No. 4,526,943 (Fuentes Jr. et al.) discloses such a process and the teachings thereof are incorporated herein by reference. The transition metal-containing catalyst is suitably prepared in accordance with U.S. Pat. No. 4,544,647 (Fuentes Jr. et al.) or U.S. Pat. No. 4,456,547 (Fuentes Jr. et al), the teachings of which are incorporated herein by reference.

Useful ethylenically unsaturated monomers include non-aromatic hydrocarbon olefins having 3 or more carbon atoms such as propylene, butene-1, octene, 1,7-octadiene and the like; substituted olefins such as acrylic acid, acrylic acid esters and the like; and other known polymerizable materials.

Chlorinated polyethylene materials are beneficially prepared by suspension chlorination as disclosed in U.S. Pat. No. 3,454,544, the teachings of which are incorporated herein by reference. The present invention is not limited to chlorinated polyethylene resins prepared by suspension or slurry chlorination procedures. Solution chlorination, such as that taught in U.S. Pat. No. 4,591,621, also produces satisfactory materials.

Other materials believed to be suitable for purposes of the present invention include the chlorosulfonated polyethylenes.

The curable compositions beneficially include from about 50 to about 150 parts by weight of filler material per hundred parts by weight of chlorinated polyethylene. The amount of filler material is desirably from about 50 to about 100 parts by weight. At less than about 50 parts of filler material per hundred parts by weight of chlorinated polyethylene, the curable compositions are economically unattractive albeit practical from a point of view of utility. At greater than about 150 parts of filler per hundred parts of chlorinated polyethylene, processing viscosity increases to unacceptable levels and physical properties begin to deteriorate. If processing difficulties and loss of physical properties are acceptable, more than 150 parts of filler may be used.

Fillers which may be used in compositions of the present invention are finely-divided materials, both reinforcing and non-reinforcing, of natural or synthetic origin in the form of regular or irregular particles, platelets or fibrous pieces. Suitable materials include various types and grades of calcium carbonate (whiting), carbon black, calcium sulfate, mica, talc, kaolin and other clay minerals, silicates, silica, barytes, magnesium carbonate, aluminum trihydrate and the like, and mixtures of such fillers.

The curable compositions include from about 20 to about 60 parts by weight of a plasticizer which is compatible with the chlorinated polyethylene resin and does not interfere with peroxide crosslinking. The amount of plasticizer is beneficially from about 20 to about 40 of plasticizer is beneficially from about 20 to about 40 parts by weight. At less than about 20 parts of plasticizer, the curable compositions are difficult to process. At greater than about 60 parts of plasticizer, the compositions, after being cured, exhibit poor physical properties and stickiness as the plasticizer exudes from the composition.

In general, plasticizers suitable for use with polyvinyl chloride can also be used in peroxide-vulcanizable chlorinated polyethylene compounds. Illustrative plasticizers include epoxidized soybean oil, dioctyl phthalate, diisononyl phthalate, dioctyl adipate, chlorinated paraffins and the like. Petroleum oils have limited utility as plasticizers for purposes of the present invention. Naphthenic petroleum oils with a medium aromatic content can be used at about the 20 part level. Aromatic type petroleum oils, while compatible with the chlorinated polyethylene, interfere with peroxide efficiency. Paraffinic petroleum oils are regarded as incompatible with chlorinated polyethylene. The plasticizer is desirably diisononyl phthalate.

The curable compositions include from about 5 to about 10 parts by weight of a stabilizer. Compositions containing less than about 5 parts of stabilizer have relatively poor thermal stability. Amounts of stabilizer in excess of 10 parts per hundred parts of halogenated polymer may be used, but are of no apparent benefit. Accordingly, such amounts are to be avoided for economic reasons.

Stabilizers are used to minimize, if not eliminate, possible decomposition of the chlorinated polyethylene by heat of processing, etc. Stabilizers conventionally used in preparation of vinyl polymer and copolymer sheet compositions are generally suitable. Examples include organic complexes, oxides and/or salts of lead, tin, barium, cadmium, magnesium, sodium, etc. Specific examples include dibasic lead phthalate, dibasic lead phosphate, lead oxide, magnesium oxide, sodium phosphate, magnesium carbonate, barium-cadmium stearate and the like, as well as mixtures thereof.

The curable compositions of the present invention are cured by a peroxide vulcanizing agent and a co-agent under extreme conditions, e.g., at a temperature of 204° Centigrade for a period of ten minutes.

The peroxides are suitably organic peroxides, beneficially tertiary organic peroxides. Illustrative peroxides include dicumyl peroxide, di-tertiary butyl peroxide, diacyl peroxide, 2,5-bis(tertiary butyl peroxy 2,5-dimethyl)hexane and $\alpha,\alpha'$-bis-(t-butylperoxy)diisopropylbenzene. $\alpha,\alpha'$-bis-(t-butylperoxy)diisopropylbenzene is desired because of its cost and availability.

If the peroxide is $\alpha,\alpha'$-bis-(t-butylperoxy)diisopropylbenzene, it is used in an amount of from about 0.5 to about 2 parts by weight (100% active) per hundred parts of chlorinated polyethylene. If another peroxide is used which is either more efficient or less efficient than $\alpha,\alpha'$-bis-(t-butylperoxy)-diisopropylbenzene, it is used in an amount sufficient to provide results equivalent to those obtained with 0.5 to 2 parts by weight (100% active) $\alpha,\alpha'$-bis-(t-butylperoxy)-diisopropylbenzene. This amount is referred to herein as a "peroxide equivalent". In other words, when another peroxide compound is used an amount of, for example, from about 1 to about 4 parts might be required to provide the peroxide equivalent. Relative efficiencies of peroxide compounds are believed to be well known.

If the peroxide equivalent is less than about 0.5, insufficient vulcanization is observed. If the peroxide equivalent is greater than about 2, the curable chlorinated polyethylene elastomer compositions have reduced ozone resistance after vulcanization.

The co-agent is preferably triallyl cyanurate. It is used in an amount of from about 5 to about 10 parts by weight per hundred parts by weight of chlorinated polyethylene resin. If less than about 5 lparts by weight are used, the curable composition, following vulcanization, has reduced ozone resistance and may not pass the minimum of 168 hours in the severe ozone test environment. If more than about 10 parts by weight are used, the curable compositions are difficult to process and, following vulcanization, tend to have reduced rubber-like properties.

Other co-agents, such as triallyl isocyanurate or triallyl trimellitate, do not provide the minimum 168 hours of resistance to ozone-induced cracking when substituted for like amounts of trially cyanurate. Cracking is observed, for example, after 24 to 48 hours when such amounts of other co-agents are used. Larger amounts, while perhaps not economically viable, may provide resistance to cracking in excess of 100 hours, or even in excess of 168 hours under the same curing and testing conditions.

The ratio of peroxide (100% active) to triallyl cyanurate is desirably from about 0.05 to about 0.4 and preferably from about 0.25 to about 0.33. Ratios outside the range of 0.05 to 0.4, while usable, have been found inadequate in terms of achieving the minimum of 168 hours of resistance to ozone cracking in the severe ozone test environment after the curable composition is vulcanized under extreme conditions, e.g., at a temperature of 204° Centigrade for a period of ten minutes.

Organic and mineral pigments which may be used in combination with curable compositions of the present invention include, for example, carbon black, titanium dioxide, iron oxide and the like as well as mixtures thereof. The pigments are suitably present in an amount of from about 2 to about 5 parts per hundred parts by weight of chlorinated polyethylene resin.

If desired, small amounts of antioxidants such as the hindered phenols, e.g., di-t-butyl-p-cresol, and processing aids such as stearic acid, waxes, etc., may be incorporated into compositions of the present invention thereby obtaining a more readily processible composition.

The compositions of the present invention are suitably mixed by a heated two roll mill, a Banbury type mixer or equivalent mixing and compounding equipment.

The compositions of the present invention are suitably cured or vulcanized using conventional rubber vulcanization processes and equipment. Satisfactory results are expected with direct press curing, lead press curing and open steam curing. The compositions are desirably vulcanized by direct press curing.

The following examples are solely for purposes of illustration and are not to be viewed as limiting the scope of the present invention. All parts and percentages are based upon one hundred parts by weight of chlorinated polyethylene unless otherwise stated. Examples of the present invention are designated by Arabic numerals whereas comparative examples are represented by alphabetic characters.

DESCRIPTION OF COMPOUNDING AND CURING PROCEDURE

Compounds were prepared and cured using the following general procedure. A Banbury type mixer (Farrell Model BR) was used to convert composition ingredients into a fused mixture. An "upside down" mixing technique was used wherein solid components other than the resin were added first. This was followed by addition of liquid components. The chlorinated polyethylene was added last. Mixing occurred as the temperature increased to about 110° Centigrade over a period of two minutes.

The fused mixture was then placed on a two roll rubber compounding mill operating at a set temperature of 25° Centigrade to prepare a smooth, uncured, heat plastified sheet having a thickness of from about 0.6 to about 0.8 centimeters. The conversion of the fused mixture to the sheet took place over a period of two minutes.

A piece of the uncured sheet was then placed in a Dake, model 44058 curing press. The press was heated to a temperature of 204° Centigrade and a ram force of 120,000 pounds per six inch diameter ram was applied to the piece of sheet to cure it. After ten minutes of heating, the ram force was reduced to zero pounds per square inch and the cured sheet was removed and quench cooled in ambient temperature deionized water.

Test samples 4 mm by 45 mm by 55 mm were then elongated in accordance with the modified DIN 53509-part 1 procedure and tested for ozone resistance in a severe ozone test environment. The modified procedure and test procedures are both described hereinabove in detail. The time to onset of ozone-induced cracking was measured to provide a measure of ozone resistance.

COMPOUND COMPONENTS

The following components were used in preparing the cured sheet: (a) 100 parts of a chlorinated polyethylene resin having a chemically combined chlorine content of about 36 percent by weight of polymer and being commercially available from The Dow Chemical Company under the trade designation CM 0136; (b) 50 parts of a ground natural column carbonate commercially available from Thompson Weiman Company under the trade designation Atomite TM; (c) 30 parts of precipitated, hydrated amorphous silica commercially available from PPG Industries, Inc., under the trade designation Hi-Sil TM 210; (d) 8 parts of magnesium oxide commercially available from C. P Hall Co. under the trade designation Maglite TM D; (e) 2 parts of carbon black commercially available from Cabot Corp. under the trade designation Sterling TM SO-N550; (f) a variable amount of $\alpha,\alpha'$-bis-(t-butylperoxy)diisopropylbenzene on Burgess KE clay (40% active dispersion), a peroxide curing agent commercially available from Hercules Inc. under the trade designation Vulcup TM 40 KE; (g) 0.2 parts of polymerized 1,2-dihydro-2,2,4-trimethylquinoline, a stabilizer commercially available from R. T. Vanderbilt & Co. under the trade designation Agerite TM Resin D; (h) 40 parts of diisononyl phthalate as a plasticizer; and (i) a variable amount of triallyl cyanurate, a co-agent commercially available from American Cyanamid Co. The amounts of peroxide curing agent (converted to 100% active) and co-agent are specified in each example and comparative example.

COMPARATIVE EXAMPLE A—EARLY ONSET OF CRACKING

Using the aforementioned compound and curing and testing procedures with 2.8 parts of peroxide curing agent and 2 parts of co-agent (peroxide/co-agent ratio of 1.4), the onset of ozone-induced cracking was observed at about eight hours. The cured compound had a 100% modulus (ASTM D412-75) of 340 pounds per square inch (psi) (2.3 megapascals (MPa)), an ultimate tensile strength (ASTM D412-75) of 2070 psi (14.3 MPa), and a percent elongation (ASTM D412-75) of 510.

COMPARATIVE EXAMPLE B—IMPROVED OZONE RESISTANCE BUT REDUCED PHYSICAL PROPERTIES

Comparative Example A was duplicated save for increasing the amount of co-agent to 8 parts (peroxide/co-agent ratio of 0.35). Although the time to onset of ozone-induced cracking increased to 168 hours, the physical properties were adversely affected. The 100% modulus increased to 1050 psi (7.2 MPa). The ultimate tensile strength decreased to 1860 psi (12.8 MPa). The percent elongation decreased to 220.

EXAMPLES 1-4 AND COMPARATIVE EXAMPLES C-D—VARIABLE AMOUNTS, BUT A CONSTANT RATIO, OF PEROXIDE AND CO-AGENT

Comparative Example A was replicated save for varying the amounts of peroxide curing agent and co-agent at a constant peroxide/co-agent ratio of 0.2. The amounts of peroxide and co-agent, the time to onset of cracking and the physical properties (100% modulus, ultimate tensile and % elongation) are summarized in Table I.

The results summarized in Table I show that the amounts of peroxide and co-agent are quite important, even at a constant peroxide/co-agent ratio. Similar results are expected with other curable compositions of the present invention.

TABLE I

| Example/Comparative Example | Amounts Peroxide | Amounts Co-Agent | Hours to Onset of Cracking | 100% Modulus (psi/MPa) | Ultimate Tensile (psi/MPa) | Percent Elongation |
| --- | --- | --- | --- | --- | --- | --- |
| C | 0.6 | 3 | 24 | 280/1.9 | 1730/11.9 | 740 |
| D | 0.8 | 4 | 24 | 320/2.2 | 2000/13.8 | 680 |
| 1 | 1.0 | 5 | 168 | 400/2.8 | 2080/14.3 | 570 |
| 2 | 1.2 | 6 | >168 | 480/3.3 | 2120/14.6 | 500 |
| 3 | 1.6 | 8 | >168 | 610/4.2 | 2230/15.4 | 400 |
| 4 | 2.0 | 10 | >168 | 820/5.7 | 2150/14.8 | 290 |

EXAMPLES 5-6 AND COMPARATIVE EXAMPLE E—CONSTANT CO-AGENT LEVEL WITH VARYING AMOUNTS OF PEROXIDE

Comparative Example A was replicated save for varying the amount of peroxide curing agent while holding the amount of co-agent at six parts, thereby varying the peroxide/co-agent ratio. The amount of peroxide, the peroxide/co-agent ratio, the time to onset of cracking and the physical properties (100% modulus, ultimate tensile and % elongation) are summarized in Table II.

The results summarized in Table II show that an excessive amount of peroxide harms the ozone resistance of a compound. Similar results are expected with other curable compositions of the present invention.

TABLE II

| Example/Comparative Example | Parts of Peroxide | Peroxide/Co-Agent Ratio | Hours to Onset of Cracking | 100% Modulus (psi/MPa) | Ultimate Tensile (psi/MPa) | Percent Elongation |
| --- | --- | --- | --- | --- | --- | --- |
| 5 | 1.2 | 0.2 | >168 | 450/3.1 | 2010/13.9 | 520 |
| 6 | 2.0 | 0.33 | >168 | 680/4.7 | 2060/14.2 | 380 |
| E | 4.8 | 0.8 | 96 | 960/6.6 | 1790/12.3 | 260 |

EXAMPLE 7 AND COMPARATIVE EXAMPLES F-I—VARYING CO-AGENT TYPE

Comparative Example A was replicated save for varying the type of co-agent and, in Comparative Example I, the amount of co-agent and the peroxide/co-agent ratio. The type and amount of co-agent, the peroxide/co-agent ratio, the time to onset of cracking and the physical properties (100% modulus, ultimate tensile and % elongation) are summarized in Table III.

In Example 7, the co-agent was triallyl cyanurate as in Examples 1-6 and Comparative Examples A-E. In Comparative Example F, the co-agent was triallyl isocyanurate (TAIC), commercially available from Mitsubishi. In Comparative Example G, the co-agent was triallyl trimellitate (TATM), commercially available from C. P Hall Co. In Comparative Example H, the co-agent was trimethylolpropane trimethacrylate (TMPTM), commercially available from Sartomer Company under the trade designation SR 350. In Comparative Example I, the co-agent was diallyl phthalate (DAP), commercially available from C. P Hall Co. A greater amount of DAP was used because it was less efficient than the other co-agents.

TABLE III

| Example/Comparative Example | Co-Agent Type | Co-Agent Parts | Peroxide/Co-Agent Ratio | Hours to Onset of Cracking | 100% Modulus (psi/MPa) | Ultimate Tensile (psi/MPa) | Percent Elongation |
| --- | --- | --- | --- | --- | --- | --- | --- |
| 7 | TAC | 8 | 0.25 | >168 | 690/4.8 | 2010/13.9 | 330 |
| F | TAIC | 8 | 0.25 | 24 | 580/4.0 | 1950/13.5 | 380 |
| G | TATM | 8 | 0.25 | 48 | 430/3.0 | 2100/14.5 | 430 |
| H | TMPTM | 8 | 0.25 | 4 | 510/3.5 | 1920/13.2 | 500 |
| I | DAP | 16 | 0.125 | 8 | 280/1.9 | 2360/16.3 | 610 |

The results summarized in Table III show that only triallyl cyanurate provides the combination of satisfactory results in terms of (a) time to onset of ozone-induced cracking and (b) physical properties of the cured compound. Greater amounts of co-agents other than triallyl cyanurate may provide such a combination but at an uneconomical cost.

EXAMPLES 8-11 AND COMPARATIVE EXAMPLES J-M—CURE CONDITION VARIABILITY AS WELL AS CHANGING THE AMOUNTS OF PEROXIDE AND TRIALLYL CYANURATE CO-AGENT

Comparative Example A was replicated save for varying the amounts of peroxide and co-agent and the peroxide/co-agent ratio. In addition, a second set of cure conditions are added for purposes of comparison. The amounts of peroxide and co-agent, the peroxide/co-agent ratio and the time to onset of cracking for compounds cured at two different sets of conditions are summarized in Table IV.

TABLE IV

| Example Comparative Example | Parts of Peroxide | Parts of Co-Agent | Peroxide/Co-Agent Ratios | Hours to Onset of Cracking | |
| --- | --- | --- | --- | --- | --- |
| | | | | Cure Condition A (20 minutes at 176° C.) | Cure Condition B (10 minutes at 204° C.) |
| J | 2.8 | 2.0 | 1.4 | 24 | 8 |
| K | 2.8 | 4.0 | 0.7 | >168 | 96 |
| L | 0.6 | 3 | 0.2 | 48 | 24 |
| M | 0.8 | 4 | 0.2 | >168 | 24 |
| 8 | 1.0 | 5 | 0.2 | >168 | 168 |
| 9 | 1.2 | 6 | 0.2 | >168 | >168 |
| 10 | 1.6 | 8 | 0.2 | >168 | >168 |
| 11 | 2.0 | 10 | 0.2 | >168 | >168 |

The results summarized in Table IV show that severity of cure conditions (time and temperature) greatly affect the resistance to ozone-induced cracking of cured compounds. Similar results are expected with other curable compositions representative of the present invention.

EXAMPLE 12 AND COMPARATIVE EXAMPLES N-O—VARYING THE AMOUNT OF PEROXIDE WHILE MAINTAINING THE PEROXIDE/CO-AGENT RATIO CONSTANT

Comparative Example A was replicated save for varying the amounts of peroxide and co-agent while holding the peroxide/co-agent ratio constant at 0.33. The amounts of peroxide and co-agent, the peroxide/co-agent ratio, the time to onset of ozone-induced cracking and the physical properties (100% modulus, ultimate tensile and % elongation) are summarized in Table V.

TABLE V

| Example/Comparative Example | Parts of Peroxide | Parts of Co-Agent | Hours to Onset of Cracking | 100% Modulus (psi/MPa) | Ultimate Tensile (psi/MPa) | Percent Elongation |
| --- | --- | --- | --- | --- | --- | --- |
| 12 | 2 | 6 | >168 | 680/4.7 | 2060/14.2 | 380 |
| N | 3.3 | 10 | 96 | 1030/7.1 | 2020/13.9 | 210 |
| O | 4 | 12 | 96 | 1310/9.0 | 1980/13.7 | 160 |

The results summarized in Table V show that an excessive amount of peroxide, even with an acceptable peroxide/co-agent ratio, adversely affects the resistance to ozone-induced cracking and the physical properties of cured compositions. Similar results are expected with other curable compositions representative of the present invention.

What is claimed is:

1. A curable composition which, after vulcanization by press curing at a temperature of 204° Centigrade for a period of ten minutes, resists ozone-induced cracking for a period of at least 168 hours when a sample thereof prepared in accordance with ASTM D 3182-74 is exposed to 200 parts of ozone per hundred million parts of air at a temperature of 40° Centigrade and a relative humidity of 55% while the sample is elongated, in accordance with a modified DIN 53509-part 1 procedure, 60%, said composition comprising (a) 100 parts by weight of a chlorinated polyethylene resin having a chemically combined halogen content of from about 15 to about 40 percent by weight of polymer, (b) from about 50 to about 150 parts of filler material, (c) from about 20 to about 60 parts by weight of a plasticizer which is compatible with the chlorinated polyethylene resin and does not interfere with peroxide crosslinking, (d) from about 5 to about 10 parts by weight of a stabilizer, (e) an amount of a peroxide compound sufficient to provide results equivalent to those obtained with from about 0.5 to about 2 parts by weight of α,α'-bis-(t-butylperoxy)diisopropylbenzene (100% active), (f) from about 5 to about 10 parts by weight of triallyl cyanurate, the ratio of the peroxide equivalent of (e), 0.5 to 2, to (f) being from about 0.05 to about 0.4.

2. The composition of claim 1 wherein the ratio of (e) to (f) is from about 0.25 to about 0.33.

3. The composition of claim 1 wherein the peroxide is selected from the group consisting of dicumyl peroxide, di-tertiary butyl peroxide, diacyl peroxide, 2,5-bis(tertiary butyl peroxy 2,5-dimethyl)hexane and α,α'-bis-(t-butylperoxy)-diisopropylbenzene.

4. The composition of claim 1 wherein the peroxide is α,α'-bis-(t-butylperoxy)-diisopropylbenzene.

5. The composition of claim 1 wherein the chlorinated polyethylene has a chemically combined chlorine content of from about 26 to about 38 percent by weight of polymer.

6. The composition of claim 1 wherein the amount of filler is from about 50 to about 100 parts by weight per hundred parts of chlorinated polyethylene.

7. The composition of claim 1 wherein the filler is selected from the group consisting of calcium carbonate (whiting), carbon black, calcium sulfate, mica, talc, kaolin and other clay minerals, silicates, silica, barytes, magnesium carbonate, aluminum trihydrate and mixtures thereof.

8. The composition of claim 1 wherein the amount of plasticizer is from about 20 to about 40 parts by weight per hundred parts of chlorinated polyethylene.

9. The composition of claim 1 wherein the plasticizer is selected from the group consisting of epoxidized soybean oil, dioctyl phthalate, diisononyl phthalate, dioctyl adipate, chlorinated paraffins and mixtures thereof.

10. The composition of claim 1 wherein the plasticizer is diisononyl phthalate.

11. The composition of claim 1 wherein the stabilizer is selected from the group consisting of organic complexes, oxides and/or salts of lead, tin, barium, cadmium, magnesium and sodium.

12. The composition of claim 1 wherein the stabilizer is selected from the group consisting of dibasic lead phthalate, dibasic lead phosphate, lead oxide, magnesium oxide, sodium phosphate, magnesium carbonate, barium-cadmium stearate and mixtures thereof.

* * * * *

UNITED STATES PATENT AND TRADEMARK OFFICE
CERTIFICATE OF CORRECTION

PATENT NO. : 4,753,971

DATED : June 28, 1988

INVENTOR(S) : William H. Davis, Jr., Raymond L. Laakso, Jr., and Michael E. Price It is certified that error appears in the above-identified patent and that said Letters Patent is hereby corrected as shown below:

Column 2, line 2 please delete "50" and insert -- 20 --.

Column 3, line 68 please delete "plasticizer is beneficially from about 20 to about 40 of".

Column 5, line 7 please delete "1parts" and insert -- parts --.

Column 6, line 45 please delete "column" and insert -- calcium --.

Column 9, line 37 please delete "are" and insert -- was --.

Signed and Sealed this

Third Day of January, 1989

Attest:

DONALD J. QUIGG

*Attesting Officer*  *Commissioner of Patents and Trademarks*